(12) United States Patent
Harden

(10) Patent No.: US 7,128,771 B2
(45) Date of Patent: Oct. 31, 2006

(54) AIR FILTER RETAINING SYSTEM

(75) Inventor: Charles Michael Harden, Salinas, CA (US)

(73) Assignee: Total Filtration Manufacturing, Santa Clara, CA (US)

( * ) Notice: Subject to any disclaimer, the term of this patent is extended or adjusted under 35 U.S.C. 154(b) by 117 days.

(21) Appl. No.: 10/873,197

(22) Filed: Jun. 23, 2004

(65) Prior Publication Data

US 2005/0022489 A1 Feb. 3, 2005

Related U.S. Application Data

(60) Provisional application No. 60/482,123, filed on Jun. 25, 2003.

(51) Int. Cl.
*B01D 46/00* (2006.01)
(52) U.S. Cl. .................. 55/385.2; 55/484; 55/502; 55/355; 55/473; 55/483; 55/490; 55/493; 55/DIG. 31; 55/495; 55/496; 55/482; 55/485; 454/187; 210/339; 210/495
(58) Field of Classification Search ............... 55/385.2, 55/484, 502, DIG. 31, 355, 473, 483, 490, 55/493, 482, 485, 495, 496; 454/187; 210/339, 210/495
See application file for complete search history.

(56) References Cited

U.S. PATENT DOCUMENTS

| | | | | |
|---|---|---|---|---|
| 3,986,850 A * | 10/1976 | Wilcox | ........................ | 55/355 |
| 4,671,811 A * | 6/1987 | Cadwell et al. | ................ | 55/355 |
| 4,946,484 A * | 8/1990 | Monson et al. | ............ | 55/385.2 |
| 5,059,218 A * | 10/1991 | Pick | ................. | 96/66 |
| 5,192,348 A * | 3/1993 | Ludwig | ...................... | 55/385.2 |
| 5,314,516 A * | 5/1994 | Kashima | ..................... | 55/484 |
| 5,476,526 A * | 12/1995 | Attermeyer | .................. | 55/496 |
| 5,613,759 A * | 3/1997 | Ludwig et al. | ............. | 362/149 |
| 6,387,140 B1 * | 5/2002 | Choi | ........................... | 55/323 |
| 6,497,739 B1 * | 12/2002 | McGill | ...................... | 55/385.2 |
| 6,511,522 B1 * | 1/2003 | Gomez et al. | ............. | 55/385.2 |
| 6,916,352 B1 * | 7/2005 | Sutton et al. | ................. | 55/483 |

OTHER PUBLICATIONS

"*Universal Holding Frame For Built-Up Filter Banks*", Farr Company, 1991.
"*Holding Frame Adapters For Single and Multi-Stage Filters*", Farr Company, 1991.
"*Hi-Track Filter Holding System*", Cambridge Filter Corp., 1990.
"*4NS Holding Frame*", Cambridge Filter Corp., date unknown.
"*Installation Instructions Magna-Frame Assembly Hepa Filter*", Farr Company, Sep. 10, 1984.
"*Magna-Frame Assembly Hepa Filter*", Farr Company, Aug. 27, 1984.
"*Holding Frame Assy Type 8 & 8 HP*", Farr Company, Apr. 30, 1990.

* cited by examiner

Primary Examiner—Matthew Savage
Assistant Examiner—Minh-Chau T. Pham
(74) Attorney, Agent, or Firm—Buchanan Ingersoll & Rooney PC

(57) ABSTRACT

A filter retaining system formed from multiple filter retaining frames is disclosed. Each of the frames is formed from either a female type extrusion or a combination of male and female type extrusions. Specifically, each frame has either a tongue or a groove which is engageable into a corresponding groove or tongue of an adjacent frame. The tongue and groove engagement provides added rigidity to the retaining system, as well as preventing air from bypassing the filters retained within each frame.

10 Claims, 4 Drawing Sheets

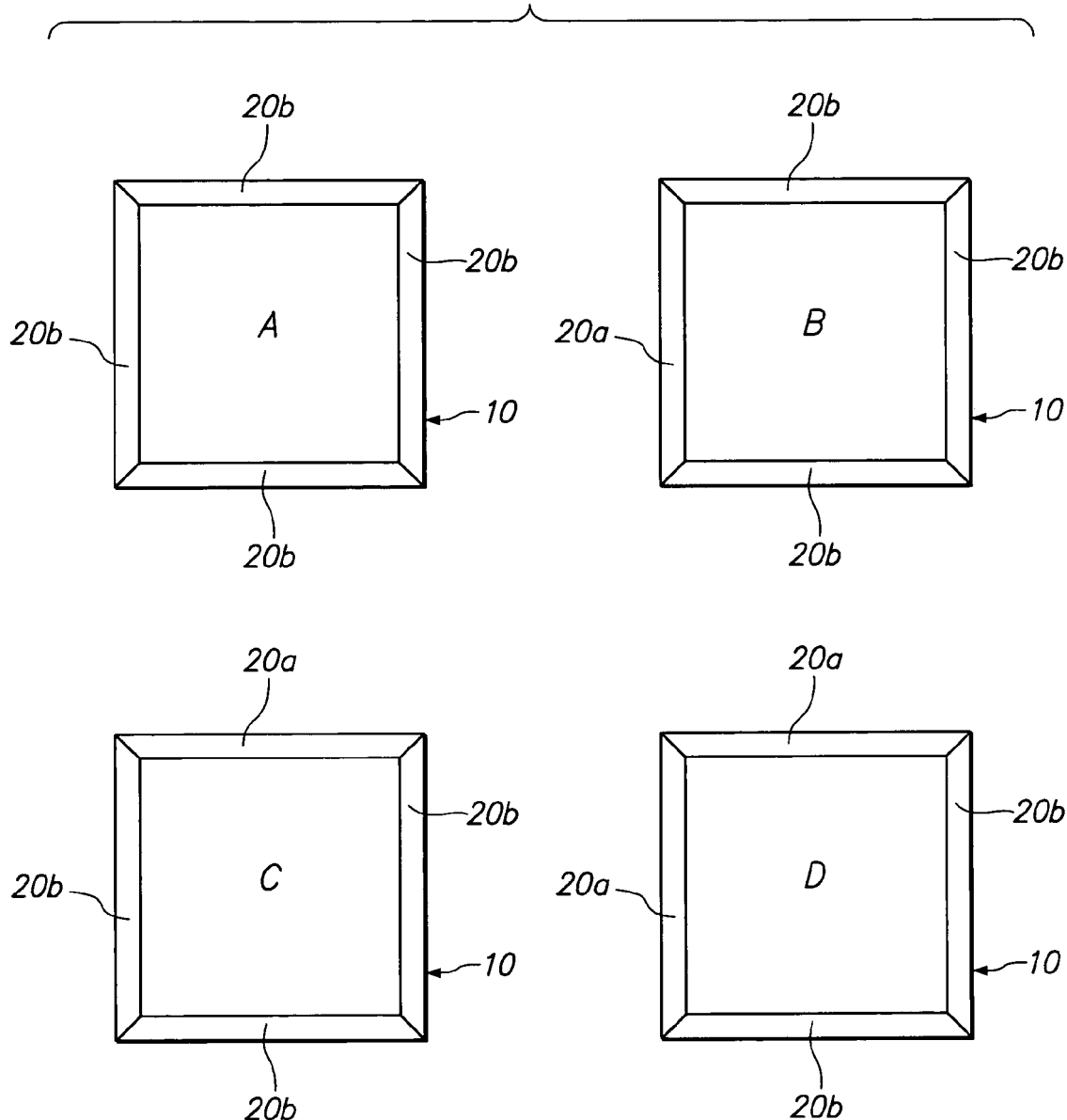

AIR FILTER RETAINING SYSTEM

This application claims the benefit of U.S. Provisional Application No. 60/482,123, filed Jun. 25, 2003, the contents of which are incorporated herein by reference.

FIELD OF THE INVENTION

The present invention relates generally to filter retention systems and more particularly to a modular framework for retaining air filters that virtually eliminates unfiltered air passing downstream.

BACKGROUND OF THE INVENTION

The requirements for clean air have forced engineers and building owners to improve the quality of air filtration devices used in office buildings and sophisticated "zero" tolerance clean rooms. In many buildings, air filtration devices comprise a series of filters placed upstream of the HVAC system. The filters are used to remove the contaminants in the air flowing through the HVAC system.

Typically, the filters are placed within a filter bank assembly having frames for holding each respective filter. The frames are fastened together to form an array of frames that retain the needed filters. Each frame is sized slightly larger than the filter placed therein, and is formed with a sealing flange which extends around the inner circumference of the frame. When a filter is inserted into a respective frame, the sealing flange abuts the filter. A gasket or other type of sealing device may be placed between the filter and the sealing flange in order to provide a better seal.

The filter is retained within a respective frame with a spring clip or other type of retention device. The spring clip tensions the filter against the sealing flange of the frame. If a pre-filter is used, then a second spring clip is used to mount the pre-filter to the filter and the frame.

Numerous problems develop with the type of filter retaining assembly described above. Specifically, air can leak downstream in the gaps between individual frame members and also between the filter and the frame. The spring clips that are used to fasten the filters to the frame can become unfastened to the frame when the filter is not in place and can become lost. Furthermore, the spring clips cannot hold the pre-filter in place when air is not flowing.

Another problem occurs when multiple frames are stacked together to form an array of filters. The array of frames will flex due to their lack of rigidity. The flexure of the frames will cause gaps between the frames and the filters, and adjacent frames thereby leaking contaminants into the airstream.

The present invention addresses the above-mentioned deficiencies in air filter retaining systems by providing a plurality of frames that prevent air leakage. Specifically, the air filter restraining system of the present invention provides a plurality of interlocking frames connected together to retain multiple filter elements. The frames interlock and seal together to prevent contaminants entering the downstream flow. Furthermore, the frames can be strengthened with a vertical member to provide better rigidity than the prior art systems. The frames of the present invention also include a better method of sealing the filter to the frame.

SUMMARY OF THE INVENTION

A filter retaining system formed from multiple filter retaining frames is disclosed. Each of the frames is formed from either a female type extrusion or a combination of male and female type extrusions. Specifically, each frame has either a tongue or a groove which is engageable into a corresponding groove or tongue of an adjacent frame. The tongue and groove engagement provides added rigidity to the retaining system, as well as preventing air from bypassing the filters retained within each frame.

Additionally, each frame includes snaplocks which retain the filter against the frame. Each snaplock is attached to the frame and is used to retain a primary filter as well as a pre-filter (if necessary). The extrusions further include a knife edge that forms a seal against the filter. The snaplocks compress the filter against the knife edge in order to seal the filter to the frame. Additionally, a neoprene gasket may be placed between the filter and the knife edge in order to provide a better seal.

Additionally, in order to provide a good seal between adjacent frames, each extrusion is formed with a sealing member that is used in conjunction with a gasket to prevent air from bypassing the filters. The sealing member is formed around the outside of each frame. The gasket is positioned between adjacent sealing members when the frames are attached together. Multiple gaskets and sealing members may be provided in order to further decrease the chance of air bypassing the filters.

Each of the extrusions is also formed with grooves that are disposed on the outside of each frame. The grooves provide a channel for an L bracket to attach the extrusions together into a rectangular shape to form the frame. The extrusions are also formed with extrusion arms that define a stiffener channel when the frames are attached together. A vertical stiffener, such as an I-beam, can be inserted within the channel in order to provide rigidity to the system.

BRIEF DESCRIPTION OF THE DRAWING FIGURES

These, as well as other features of the present invention, will become more apparent upon reference to the drawings wherein:

FIG. 5 is a plan view illustrating which extrusions are used to form the different types of filter retainer frames.

DETAILED DESCRIPTION OF THE INVENTION

Figure 1:
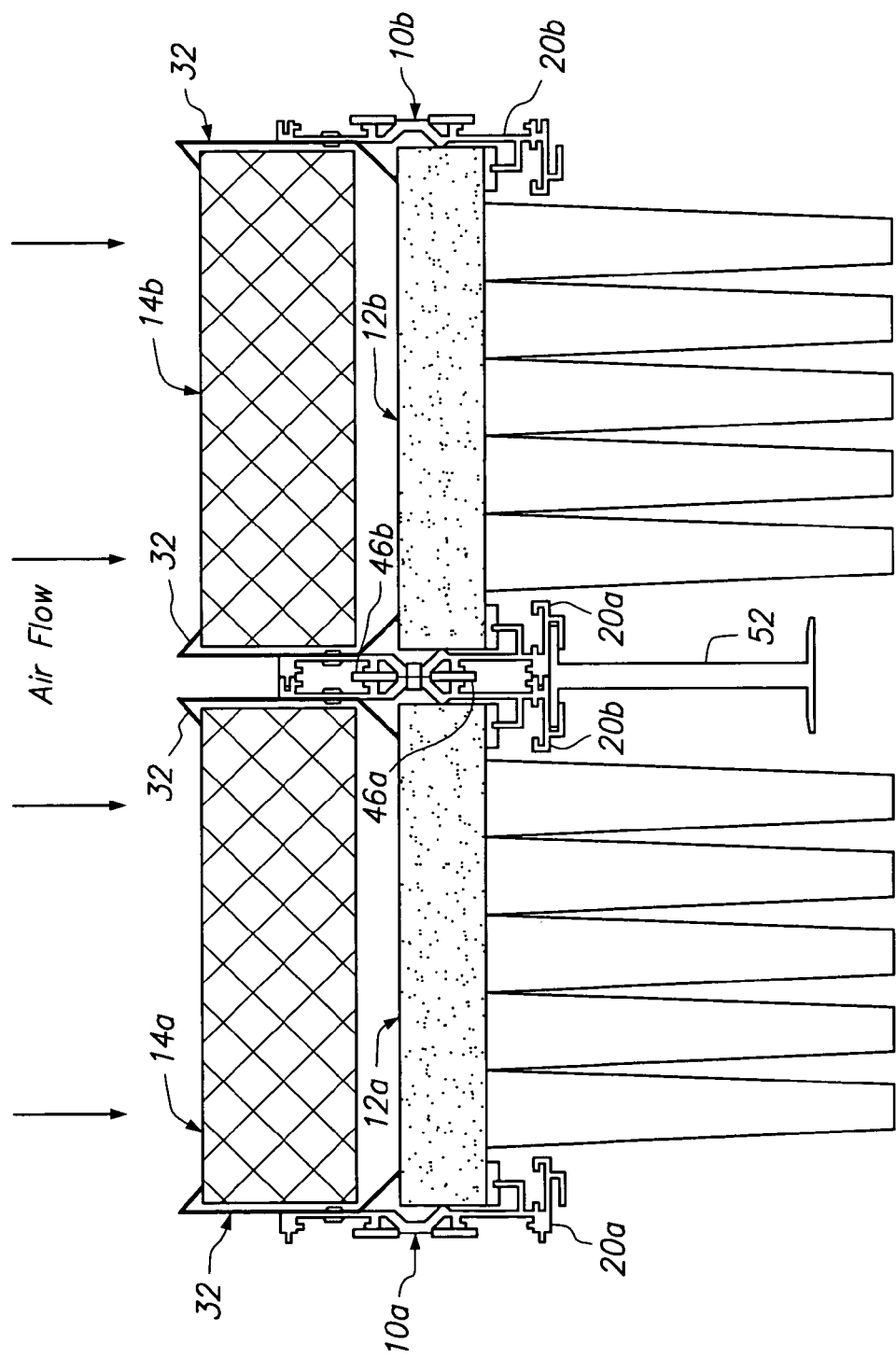
FIG. 1 is a cross-sectional view of two air filter retainer frames with primary filters and pre-filters.

Referring now to the drawings wherein the showings are for purposes of illustrating a preferred embodiment of the present invention only, and not for purposes of limiting the same, FIG. 1 is a cross-sectional view of two filter retainer frames 10a and 10b. Each filter retaining frame 10 is sized to accept a respective primary filter 12a, 12b. Pre-filters 14a, 14b can be positioned upstream of the primary filters 12, as will be further explained below.

Figure 4:
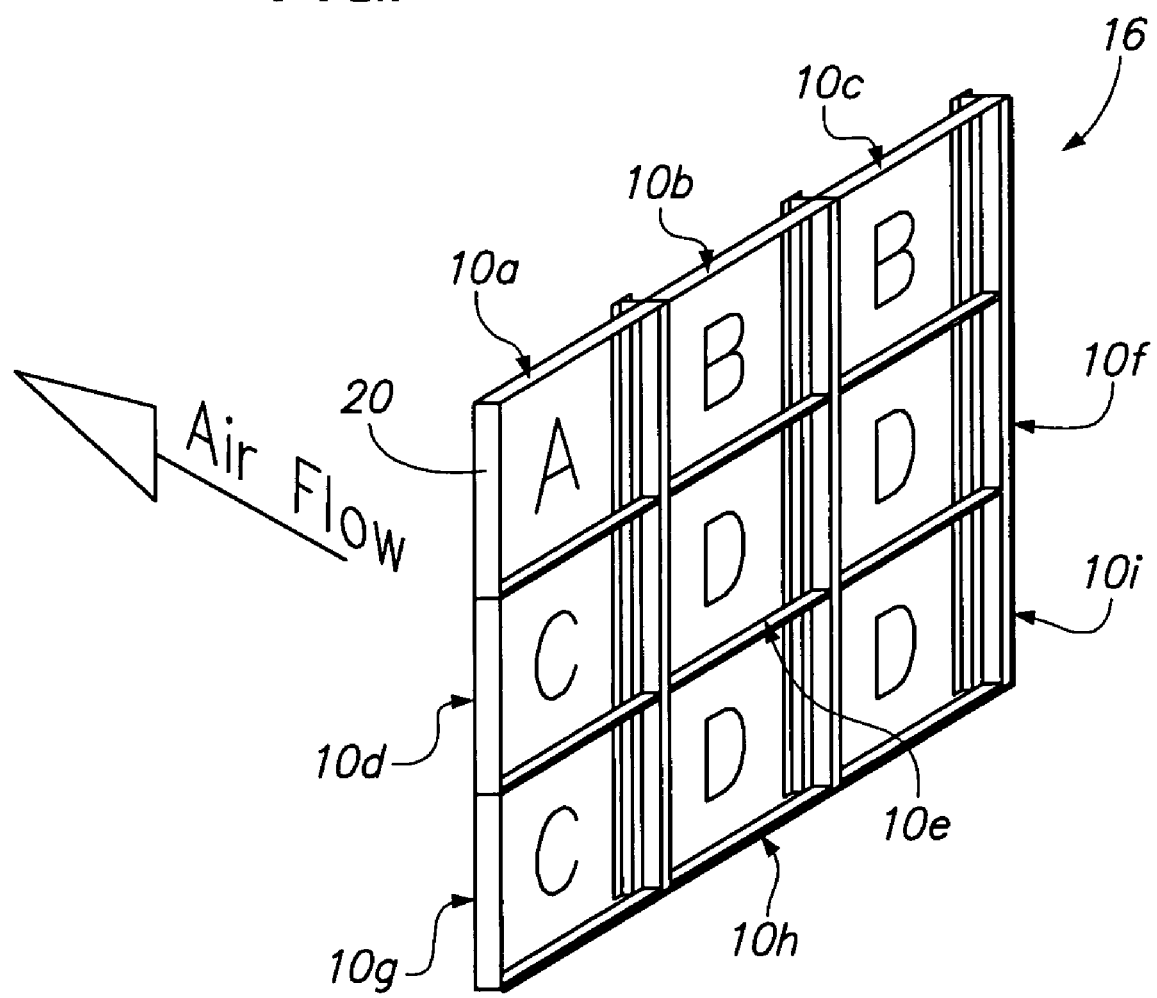
FIG. 4 is a perspective view of nine air filter retainer frames attached together to form an air filter retaining system.

As seen in FIG. 4, the filter retainer frames 10a–10i are arranged to form a filter retaining system 16. Each frame 10 is used to hold a filter 12 with an optional pre-filter 14. As will be further explained below, each of the frames 10 are designed to be interlocking with an adjacent frame in order to provide precise alignment of the filters 12 in frames 10, along with providing an airtight seal between adjacent frames.

Figure 2:
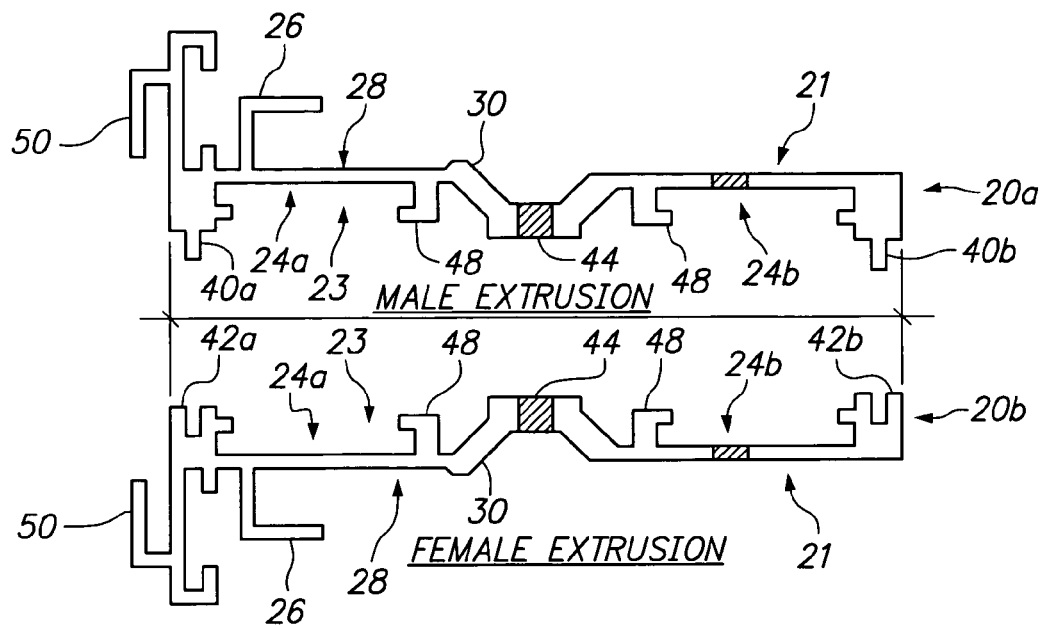
FIG. 2 is a cross-sectional view illustrating the difference between a mail extrusion and a female extrusion used to fabricate the air filter retainer frames shown in FIG. 1.

Each frame 10 is formed by assembling four frame extrusion 20 into a generally rectangular pattern. As will be further explained below, each frame extrusion 20 is either a male extrusion 20a or a female extrusion 20b. Referring to FIG. 2, each of the frame members are formed to be interlocking with an adjacent frame member through the use of a tongue and groove system. Specifically, each frame 10 is formed by the combination of male extrusions 20a and a female extrusions 20b. The combination of male or female extrusions 20a, 20b depends on the configuration of the retaining system 16 and will be further explained below.

Referring to FIG. 2, a cross-sectional view of male extrusion 20a and female extrusion 20b is shown. Both the male extrusion 20a and female extrusion 20b are approximately three inches wide and are adapted to retain a filter 12 and pre-filter 14. Each extrusion 20 has an inner side 21 which faces the filter 12 and pre-filter 14, and an outer side 23 which abuts adjacent frames 10.

The length of the extrusions 20 can vary depending on the size of the filter 12. Typically, the length of each extrusion 20 is decided to accommodate common sizes of filter 12. For instance, the extrusions 20 can be attached together to form rectangular frames 10 which retain 24×24, 24×20, 24×12 and 20×20 inch sized filters.

The extrusions 20 are connected into a rectangular shape through the use of L brackets (not shown). An L bracket will connect two extrusions 20 together in ninety degree alignment to one another. Each extrusion 20 includes L bracket alignment grooves 24a, 24b formed on the outer side 23. Each L bracket is inserted into a respective L bracket alignment groove 24a, 24b of on each of the extrusions 20 at the corners of the frame 10. The L bracket is welded or otherwise affixed to the extrusions 20 in order to form the frame 10. In this respect, four L brackets will attach four extrusions together to form the rectangular frame 10.

Each extrusion 20 further includes an L-shaped knife edge 26 to seal the filter 12 to the extrusion 20. The knife edge 26 is formed outwardly from the inner side 21 of the extrusion 20 such that it projects toward the filter 12. A filter abutment area 28 is defined adjacent to the knife edge 26 on the inner side 21 of extrusion 20. When a primary filter 12 is inserted into a frame 10, the filter 12 contacts the inner side 21 of the extrusions 20 at the filter abutment area 28. The knife edge 26 provides a narrow edge which the filter 12 is compressed against thereby providing an effective seal between the extrusion 20 and the filter 12. Additionally, a neoprene gasket may be inserted between the filter 12 and the knife edge 26 to increase the effectiveness of the seal.

Each extrusion 20 is formed with a raised embossment 30 on the inner side 21. The embossment 30 facilitates insertion of the filter 12 into the frame 10 by guiding and centering the filter 12 into the frame 10.

Referring to FIG. 1, in order to retain the filter 12 within the frame 10 and compress the filter against the knife edge 26, snap locks 32 are attached to the extrusions 20. The primary filter 12 is retained against the knife edge 26 with snap lock 32. Two snap locks 32 are typically attached to each extrusion 20 that form the top and bottom of a frame 10. Each snaplock 32 is attached to the inner side 21 of the extrusion 20 through the use of a fastener such as a pop rivet. The fastener extends through the snaplock 32 and into the extrusion 20. The snaplock 32 is attached to the extrusion 20 in a location that accepts filter 14 with a 1"header.

Figure 3A:
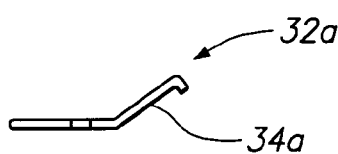
FIGS. 3a–3c are cross-sectional views of fasteners used to retain a filter within a respective air filter retainer frame.
Figure 3B:
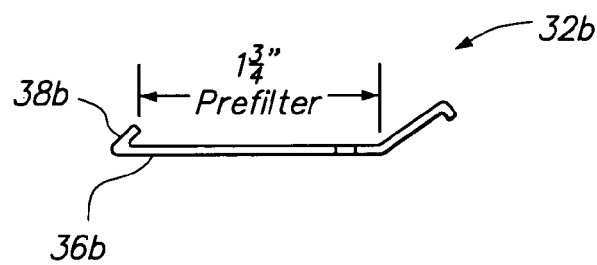
Figure 3C:
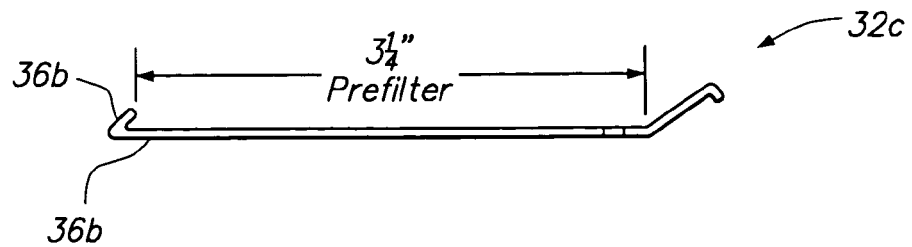

Referring to FIGS. 3a–3c, three different snaplocks 32a, 32b, and 32c are shown for different applications. If only a primary filter 12 is used without a pre-filter 14, then snaplock 32a is used. The snaplock 32a has a filter engagement tang 34a which locks the filter into place against the knife edge 26. If a pre-filter 14 is used, then snaplocks 32b and 32c are used. Each of the snaplocks 32b and 32c include pre-filter tangs 36b and 36c with respective pre-filter engagement lips 38b and 38c to engage the edges of the pre-filter 14. In this regard, the pre-filter engagement lips 38b, 38c compress the pre-filter 14 against the primary filter 12. Snaplock 36b is used with pre-filters that are 1 ¾" thick, while snaplock 36c is used for pre-filters that are 3 ¾" thick. It will be recognized by those of ordinary skill in the art, that the snaplocks 32 prevent the filter 12 and pre-filter 14 from falling off of the frame 10 during zero air flow conditions by always applying constant contact pressure between the filter 12 (and pre-filter 14) and the frame 10. Furthermore, because the snaplocks 32 are fastened to a respective extrusion 20 they cannot be removed or lost.

As previously mentioned, the outer sides 23 of the extrusions 20 are in abutting contact when the frames 10 are assembled into a filter retaining system 16. Referring to FIG. 2, the outer side 23 of the male extrusion 20a abuts the outer side 23 of the female extrusion 20b. In this regard, the male extrusion 20a has a first and second tongue 40a, 40b extending from the outer side 23. Formed in the outer side 23 of the female extrusion 20b are grooves 42a, 42b. The grooves 42 form a rectangular channel sized slightly larger than the tongues 40. In this respect, tongue 40a is frictionally engageable into groove 42a, while tongue 40b is frictionally engageable into groove 42b when extrusions 20a and 20b are in abutting contact. The tongue 40 and groove 42 provide stability when assembling the retaining system 16, as well as preventing airflow from bypassing the filter 12.

Each extrusion 20 has a fastener aperture 44 formed therein for attaching adjacent frames 10 together. A fastener, such as a rivet, extends through the aperture 44 of abutting extrusions 20 in order to rigidly attach the frames 10 together. The aperture 44 is formed on corresponding locations of each extrusion 20 in order to properly align the frames 10.

Referring to FIG. 1, two inner gaskets 46a, 46b are positioned between abutting extrusions 20. Each of the extrusions 20 has two L shaped sealing members 48 extending from the outer side 23. The inner gaskets 46a, 46b are compressed between the sealing members 48 thereby forming an airtight seal which prevents air from bypassing the filter 12. Each of the gaskets 46 are formed from neoprene and are placed on the extrusions 20 to circumferentially surround each frame 12.

As previously mentioned, the prior art air filter assemblies do not exhibit great structural rigidity such that gaps can form between the frame members. In order to increase the structural rigidity of the filter retaining system 16, each extrusion 20 is provided with an extrusion arm 50 for attachment of a vertical member. Specifically, a vertical channel is defined by the extrusion arms 50 of abutting extrusions 20. The vertical channel receives a vertical frame stiffener 52 (FIG. 1). The frame stiffener 52 is a steal I-beam that is placed between adjacent frames 10.

The frames 10 are each constructed so that there is a tongue and groove attachment between each adjacent frame 10. Referring to FIGS. 4 and 5, there are four different types of frames 10 which form the retaining system 16. Specifically, a type "A" frame 10 is formed with female extrusions 20b on each of the top, bottom, left and right sides. A type "B" frame 10 has female extrusions 20b on the top, bottom and right sides, while a male extrusion 20a is on the left side. In this regard, the female extrusion 20b of the right side of the "A" type frame 10 engages the male extrusion 20a of the left side of the "B" type frame. In order to form a complete system, there is also provided a "C" type frame 10 which has female extrusions 20b on the left, right and bottom sides, while the top side is a male extrusion 20a. A "D" type frame has male extrusions on the top and left sides, and female extrusions 20b on the right and bottom sides. As seen in FIG. 4, by using the correct type of frame 10, it is possible to create a 6x6 array of filters or any desired size.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An air filter retaining system for supporting a plurality of filter elements of different sizes, comprising:
    a plurality of rectangularly configured frames joined together in a vertically standing rectangularly array, each said frame being made of an assembly of extrusions selected from at least
    first extrusions of a first particular length, each having an inwardly facing side for engaging the sides of a filter element, and an outwardly facing side including at least one outwardly extending engagement member of a first mating type or a second mating type matingly opposite to said first mating type,
    second extrusions of a second particular length, each having an inwardly facing side for engaging the sides of a filter element, and an outwardly facing side including at least one outwardly extending engagement member of said first mating type or said second mating type, or
    third extrusions of a third particular length, each having an inwardly facing side for engaging the sides of a filter element, and an outwardly facing side including at least one outwardly extending engagement member of said first mating type or said second mating type,
wherein each row of said array has its vertical dimension determined by the lengths of the extrusions forming the vertical sides of the frames in the row, and each column of said array has its horizontal dimension determined by the lengths of the extrusions forming the horizontal sides of the frames in the column, and wherein the extrusions forming contiguous sides of adjacent frames have engagement members of opposite mating types interlocked together to rigidly secure the adjacent frames together.

2. The air filter retaining system of claim 1 wherein the first type of engagement member includes a tongue and the second type of engagement member includes a groove, the tongues and grooves being configured to interlock when the frames are in abutting contact.

3. The air filter retaining system of claim 2 wherein each frame further comprises at least one snaplock fitting for retaining an air filter disposed therewithin.

4. The air filter retaining system of claim 1 wherein the inwardly facing sides of each said extrusion include a knife edge member extending therealong for sealingly engaging an air filter disposed within a frame.

5. The air filter retaining system of claim 1 wherein the outwardly facing side of each said extrusion includes at least one corner fastener receiving groove formed therein, and wherein each corner of each frame is fastened together by an L-shaped bracket having legs adapted to extend into the receiving grooves.

6. The air filter retaining system of claim 5 wherein the outwardly facing sides of each said extrusion include a sealing member extending along the length thereof, and wherein said system further comprises a gasket disposed between the sealing members of contiguous extrusions in order to prevent air from flowing between the frames.

7. The air filter retaining system of claim 6 wherein each of the first frame comprises a plurality of extrusions attached to together to form the frame.

8. The air filter retaining system of claim 7 wherein the extrusions are configured to form a rectangular shaped first frame.

9. The air filter retaining system of claim 1 wherein the outwardly facing side of each said extrusion further includes at least one alignment groove formed therein, and wherein the ends of the extrusions forming each corner of each frame are fastened together by an L-shaped bracket the legs of which are inserted into said grooves.

10. The air filter retaining system of claim 9 wherein one lateral extremity of each of the extrusions is formed with an outwardly facing slot, the slots of adjacent frames defining a stiffener channel to accept a flange of a system stiffening I beam.

* * * * *